United States Patent [19]
Ewald

[11] 3,918,611
[45] Nov. 11, 1975

[54] PRESSURE RELIEF SYSTEM FOR AN AEROSOL DISPENSER
[75] Inventor: Ronald F. Ewald, Rolling Meadows, Ill.
[73] Assignee: Seaquist Valve Company, Div. of Pittway Corporation, Cary, Ill.
[22] Filed: Nov. 19, 1973
[21] Appl. No.: 416,803

Related U.S. Application Data
[62] Division of Ser. No. 160,645, July 8, 1971, Pat. No. 3,791,561.

[52] U.S. Cl. ............................................... 222/396
[51] Int. Cl.² .......................................... F16K 17/02
[58] Field of Search ............ 222/396, 397; 220/207; 137/516.15, 525, 525.3

[56] References Cited
UNITED STATES PATENTS
3,283,959  11/1966  Muller ............................... 222/396
3,669,316  6/1972  Corsette ............................ 222/397
3,741,445  6/1973  Green ................................ 222/397

Primary Examiner—Stanley H. Tollberg
Attorney, Agent, or Firm—Stein & Orman

[57] ABSTRACT

A pressure relief system for an aerosol dispenser utilizing resilient flexing rings or gaskets arranged in sealing relationship relative to vent ports and/or relief passageways so that, at a predetermined pressure, the force of the propellant and product within the aerosol dispenser acts outwardly against these flexing members to break the seal. Uniquely, the same vent ports and/or relief passageways may be used to pressure fill the aerosol dispenser. In one embodiment, a rotatable button overcap is included as a locking means to prevent inadvertent discharge.

9 Claims, 36 Drawing Figures

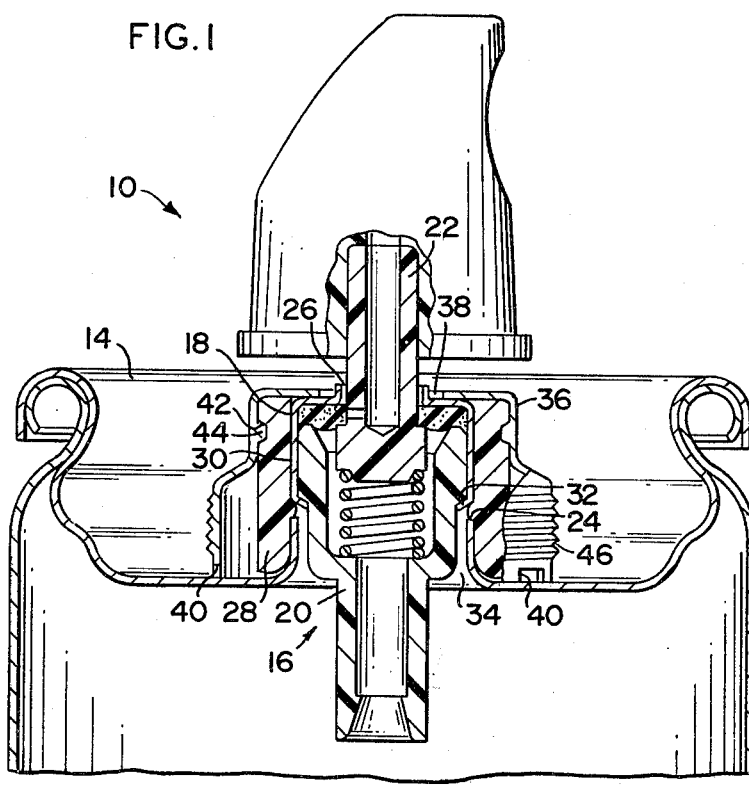
FIG. 1
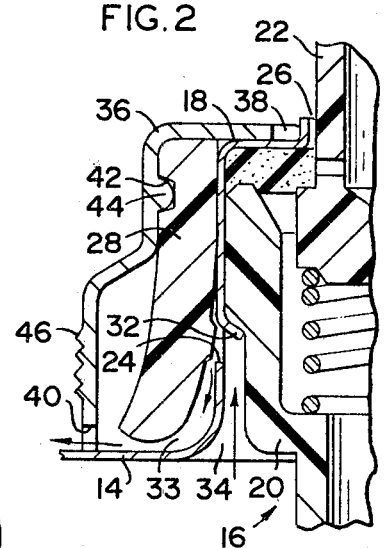
FIG. 2
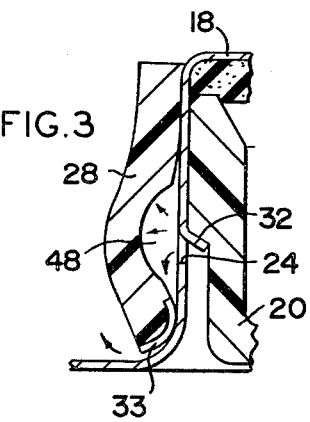
FIG. 3
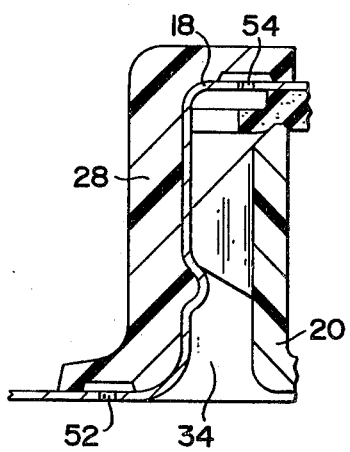
FIG. 5
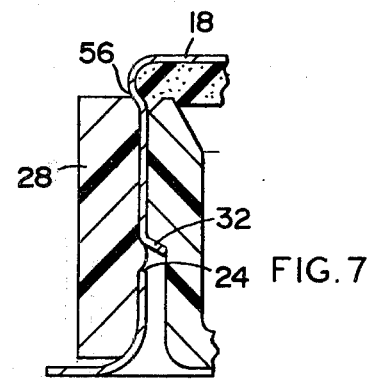
FIG. 4
FIG. 7
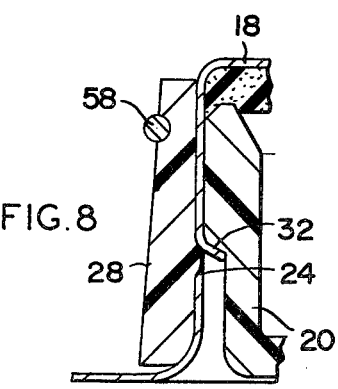
FIG. 8
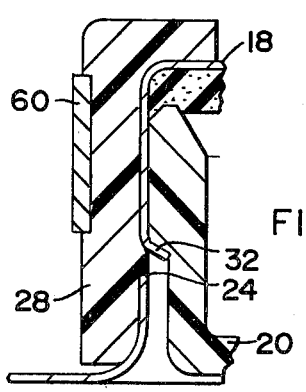
FIG. 9

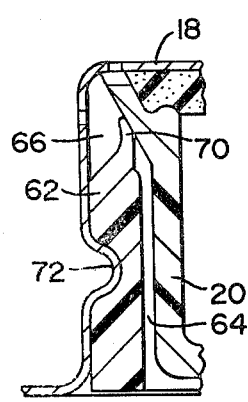
FIG. 11
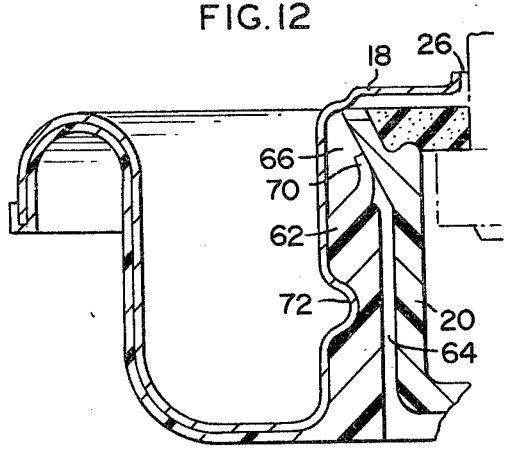
FIG. 12
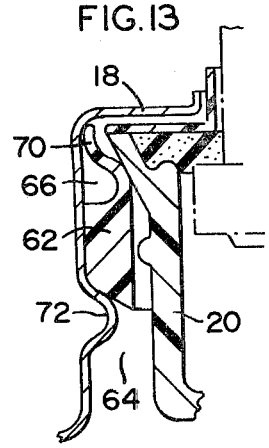
FIG. 13
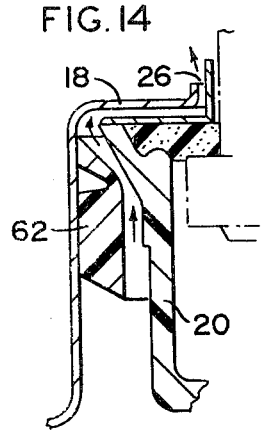
FIG. 14
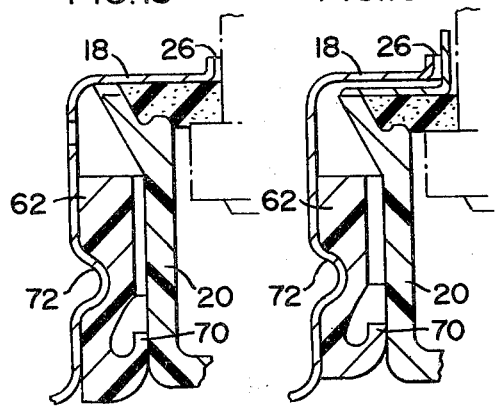
FIG. 15 FIG. 16 FIG. 17
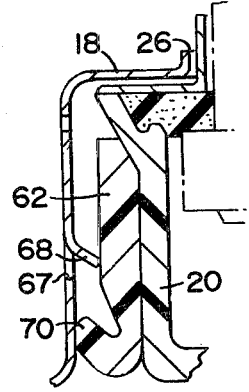
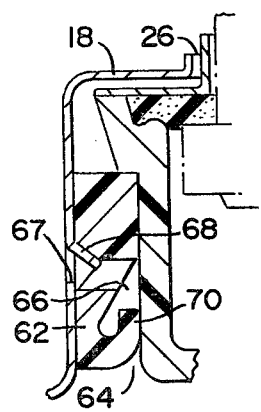
FIG. 18
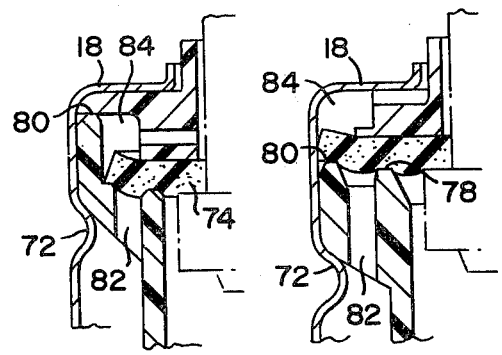
FIG. 20 FIG. 21
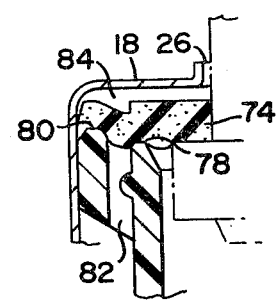
FIG. 22
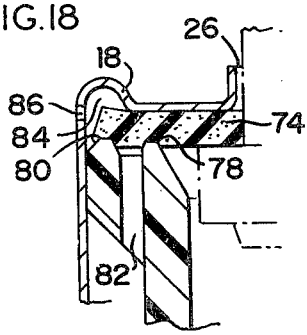
FIG. 23

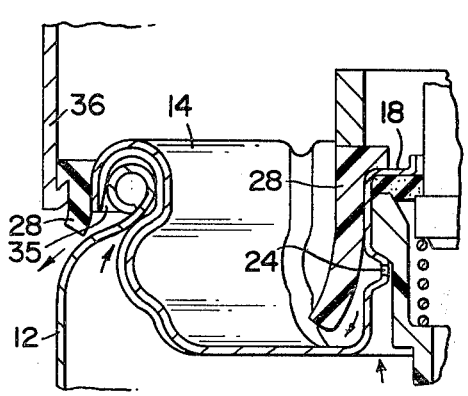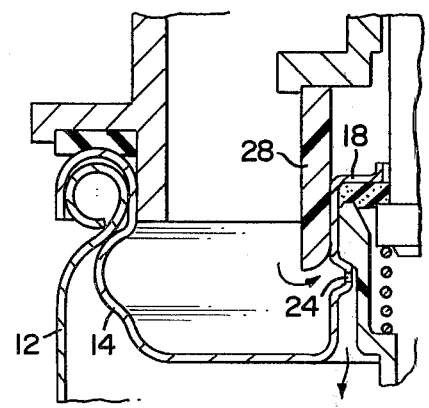
FIG. 6　　　　　　　　FIG. 10
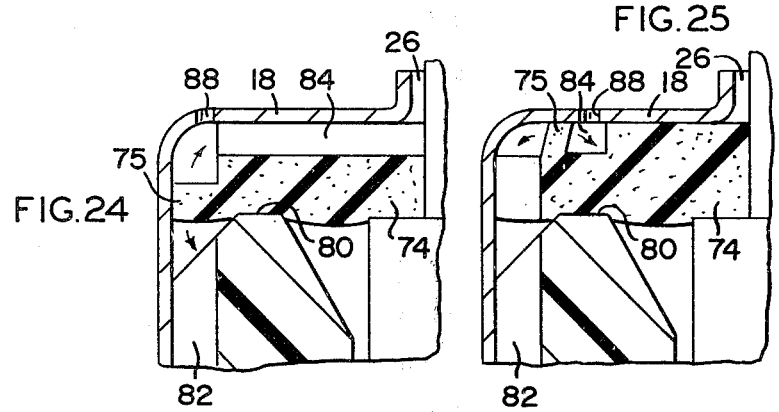
FIG. 24　　　FIG. 25
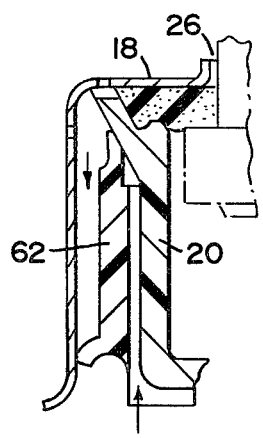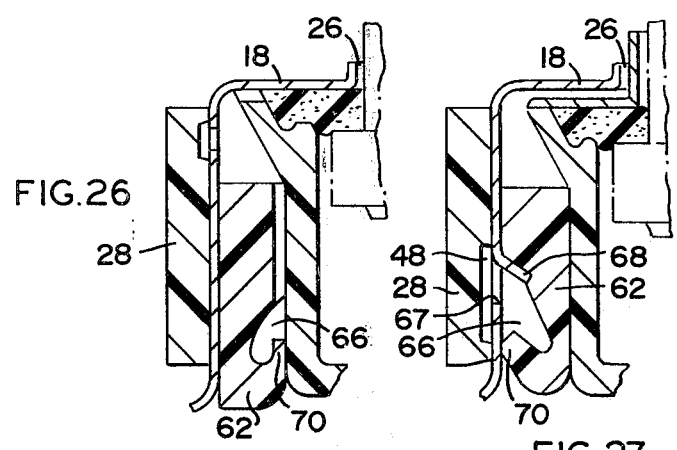
FIG. 19　　FIG. 26　　　　FIG. 27
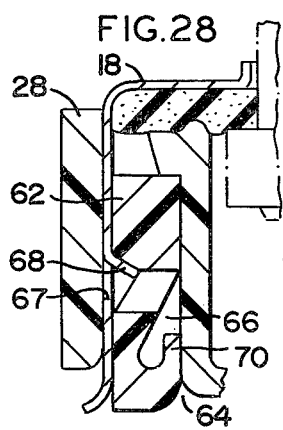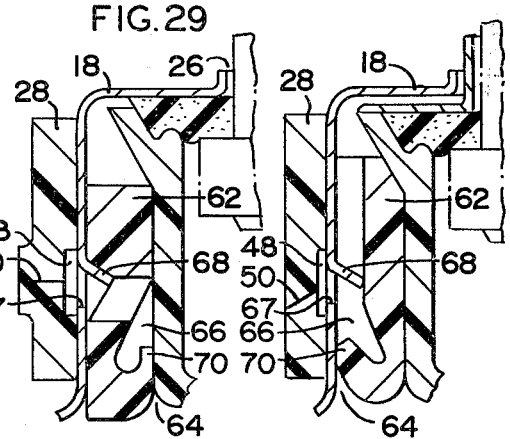
FIG. 28　　FIG. 29　　　FIG. 30

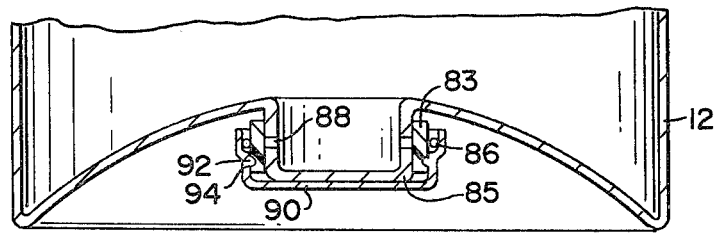
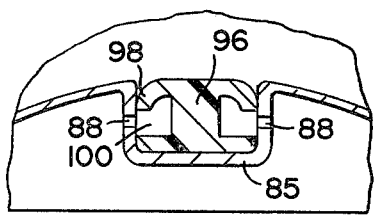
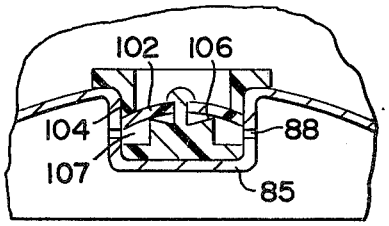
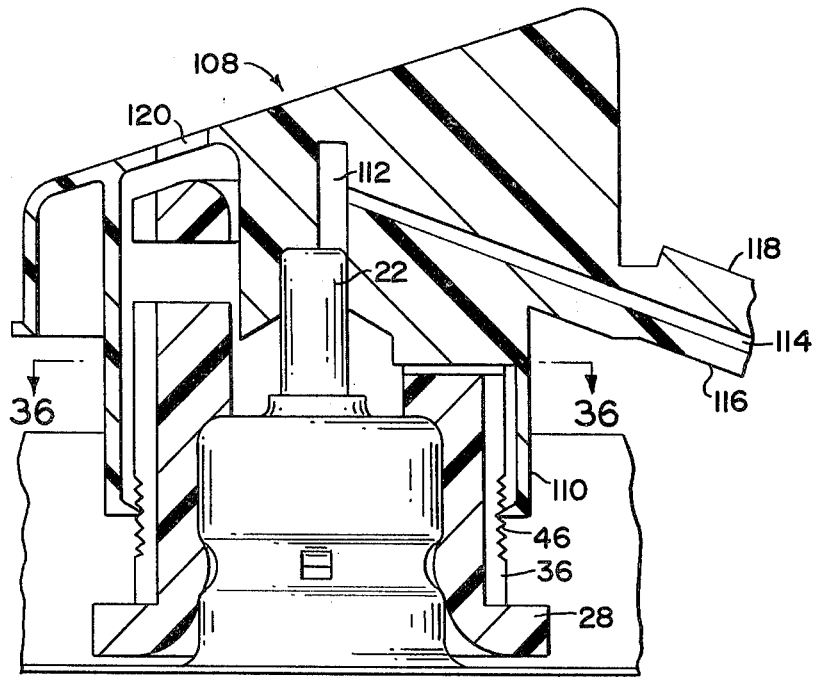
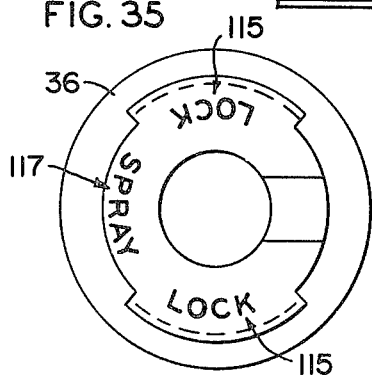
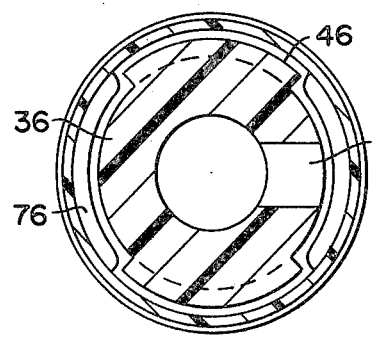

PRESSURE RELIEF SYSTEM FOR AN AEROSOL DISPENSER

This application is a divisional application of patent application Ser. No. 160,645 filed July 8, 1971, now U.S. Pat. No. 3,791,561.

BACKGROUND OF THE INVENTION

1. Field of the Invention

This invention relates to means for venting overpressures created in an aerosol dispenser. More specifically, this invention relates to a pressure relief system which utilizes resilient flexing rings or gaskets to form a seal over vent ports and/or relief passageways such that the seal will be broken at a predetermined pressure to relieve any overpressure within the dispenser. These same vent ports and/or relief passageways also provide a means for pressure filling of the aerosol dispenser.

2. Description of the Prior Art

The introduction of many new products into the aerosol dispenser market has greatly increased their use. Since conventional aerosol dispensers contain products and propellants under pressure they are constructed to withstand this internal pressure. However, these dispensers are particularly susceptible to internal overpressure conditions caused by external heat sources such as heaters, radiators, rear window shelves of automobiles and the like which are normally found in the environment in which these containers are used and stored. In view of the potential hazard due to explosion resulting from such overpressures, it is desirable that these dispensers include an adequate pressure relief system.

Many relief systems presently available are not readily adaptable to existing aerosol valves or containers. Thus, substantial design changes must be made to existing valves or containers with attendant increased costs of redesign and manufacture which, in many cases, is prohibitive.

Other systems do not reseal when the dispenser is no longer in an overpressure condition. These "one shot" systems deplete the contents of an aerosol dispenser which is undesirable. A further disadvantage of one shot system is that they do not allow effective quality control examination for detection of faulty systems during manufacture and assembly.

Another problem common to many systems is the limited variables available for controlling the predetermined overpressure relief point. The margin between ambient conditions and a dangerous overpressure condition is often very slight. Due to these critical tolerances, many systems are not adequate since the dispenser is subject to either premature exhaustion or ineffective pressure relief. Unfortunately, properly designed relief systems are usually complex and costly.

Many existing systems provide for adequate pressure relief but do not incorporate any tamperproof means to prevent dislodging or other malfunction. This is highly undesirable since the reliability of a safety system should be for the life of the container.

Auxiliary to the overpressure relief problem of aerosol dispensers, is that many designs utilize pressure filling of the container after the valve assembly is mounted therein. The product and propellant are forced under pressure through the valve and into the container through the dispensing orifice.

Since proper discharge of the propellant and product govern the size of the orifice, such necessarily limits the flow of the product into the container during the filling process. Thus pressure filling is generally time consuming and otherwise inefficient due to the relatively small size of the dispensing orifice. When an overpressure relief system is incorporated into the valve or even the container, the problems which plague pressure filling becomes even more pronounced. The vent ports or passageways must be considered. Furthermore, disengagement of the dip tube from the valve body during pressure filling process must also be considered. Since such disengagement would render the filled dispenser useless, steps must be taken to avoid such and this, dependent upon the pressure relief system used, must also be considered.

Still another recurring problem associated with aerosol dispensers, in general, much less those having pressure relief systems, is the inadvertent dispensing of product by carelessness, tampering and the like. Although a limited number of dispenser designs exist which feature various locking mechanisms, these designs are often complex and not easily adapted to aerosol dispenser with pressure relief systems.

In summary, most aerosol dispensers are a potential safety hazard if they contain no pressure relief system. The design of such an aerosol dispenser severely inhibits the use of pressure filling.

While various attempts have been made at solving the problem, unfortunately, most are inefficient and unnecessarily costly. Accordingly, a great deal of room for development and improvement remains.

SUMMARY OF THE INVENTION

This invention relates to a tamperproof aerosol dispenser pressure relief system which includes flexing rings or gaskets arranged in sealing relationship relative to vent ports and/or relief passageways specifically designed as a means for relieving overpressures. Uniquely, the vent ports may be used as filling apertures even with the valve within the container and the rate of filling is not restricted by the size of the discharge orifice. Hence, this invention doubles as a pressure relief system as well as a rapid and efficient pressure filling system.

In addition, the pressure relief system of the invention is tamperproof to insure reliability over the life of the container.

More particularly, the present invention comprises a flexible resilient member acting in combination with vent ports and/or relief passages to vent the product and propellant to the atmosphere at a predetermined pressure release point. Three basic embodiments are involved.

The first embodiment comprises an external relief ring made of resilient material; such as rubber or plastic tubing, stretched over the turret of the mounting cup of the valve or over a pressure relief turret located on the bottom of the aerosol dispenser. The location of the vent ports is not restricted to the side of the turret since the relief ring may be extended to the base of the turret as well as the top. When mounted, the ring forms a sealed engagement or bond with the outer surface of the turret. At least one, but preferably a plurality of, vent ports are formed in the turret immediately adjacent to the relief ring and in communication with relief passages formed between the valve body and internal surface of the turret itself. Guide vanes may be formed on the side of the turret and disposed in the relief passages to direct the released porduct and propellant against the relief ring through the vent ports.

The structure of this embodiment provides a number of alternatives for developing the predetermined pressure release point. First, the resilient material that is used may be preselected for a particular pressure release point. Second, the size of the port in the mounting cup turret may be designed to effect a certain amount of surface area on which the pressure is applied. A third alternative is a preselection of the undercut in the relief ring itself to force it to operate in a direction determined by the size and angle of the undercut. In addition, a chamber may be formed in the internal surface of the relief ring immediately adjacent the vent ports so that in combination with the variation in the angle of the undercut, the pressure release point is varied.

It should be evident from the above description that the simplicity of this embodiment when used on a mounting cup turret allows its use upon existing valves by the mere addition of relief ports in the turret.

To insure maximum retention of the external relief ring, one of several retaining means may be employed. A spring wire or plastic snap band may be press fitted about the upper circumference of the external relief ring. Alternatively the mounting cup may be provided with an undercut on its upper portion thereby acting as a wedge against removal when it is in place.

As another retention means combined with a means to tamperproof the entire relief system, a cup shaped tamperproofing cap may be mounted over the mounting cup and relief ring. Apertures may be formed in the skirt of this cap to diffuse the product and propellant escaping to the atmosphere during overpressure.

As a still further supplemental design a rotatable locking overcap designed to fit over both the tamperproofing cap and the safety release valve assembly of this invention may be utilized. This locking overcap includes locking legs, with feet which engage parallel interrupted locking grooves formed on the outer lower surface of the tamperproofing cap. The grooves and locking feet also provide means for adjusting the locking overcap for the varying size of actuator assemblies. An indicator is positioned on the top of the tamperproofing cap to show whether the actuator is rotated into its "lock" or its "spray" position. When in the lock position, the engagement of the locking feet with the locking grooves prevents vertical movement of the locking overcap. By rotating the overcap 90°, the locking feet and interrupted locking grooves are disaligned thereby permitting vertical movement of the overcap and actuation of the valve.

In addition this embodiment permits the use of the vent ports as fill orifices for pressure filling the container prior to applying the relief ring. Prior to mounting of the relief ring, product and propellant may be forced under pressure through the vent ports. After the container is filled, the pressure relief ring is stretched over the turret.

In use and under normal condition, the container and valve will withstand the internal pressure of the product and propellant. However, when the internal pressure increases over the pressure relief point, the product and/or propellant are forced upward into the relief passage and directed outward through the vent ports against the relief ring by the guide vanes immediately above the vent ports. The resilient relief ring is then forced outward breaking the seal permitting some product and/or propellant to escape into the surrounding atmosphere. If a tamperproofing cap is used, it escapes through the apertures formed in the skirt of the cap.

When the overpressure decreases below the pressure release point, the resilient relief ring will again seal against the turret surface preventing any further escape of product and/or propellant.

When not in use, and if the locking overcap is used, it may be put in the locked position. When locked, the locking post is forced through an indicator window formed in the locking overcap to prevent rotation. To again use, the locking post is depressed and the actuator is rotated 90° to disalign the locking feet and locking grooves thus again permitting the vertical movement of the actuator. In this position spray will again appear in the indicator window.

The second embodiment comprises an internal relief ring made of resilient material located inside the turret of the mounting cup and the valve body. The size of the ring is such that it forms a seal with the inner surface of the turret and the valve body and creates a lower chamber in direct communication with the product and propellant and an upper chamber which is in direct communication with at least one, but preferably a plurality of vent ports, formed in the turret. At least one extremity of the relief ring includes a flexing lip designed to flex either in an internal overpressure condition or during pressure filling such that when flexed the seal formed by the ring is broken thus permitting communication between the two chambers.

The pressure release point will be determined by the thickness of the lip and the amount of surface area exposed to pressure.

Unlike the external relief ring, this embodiment requires some valve component changes. The turret diameter may have to be increased to allow room for the inner relief ring. The diameter or even the shape of the valve body may hereto be changed to insure a good seal.

This internal relief ring may also be mounted in a turret in the base of the aerosol container. Here existing valve and container configurations other than the base of the container need not be modified.

In use, as the pressure reaches a predetermined release point, the seal formed between the sealing lip and the upper portion of the valve body is broken permitting product and/or propellant to flow through the upper chamber out the vent ports formed either in the turret or through the space at the base of the valve stem and into the atmosphere.

When the container pressure decreases to the pressure release point, the resilient sealing lip will again seal against the valve body preventing any further escape of propellant and/or product.

To pressure fill, product and propellant are forced, under pressure, through the vent ports and against the internal relief ring. Such causes the sealing lip to open inwardly allowing the product and propellant to flow freely through the chambers and into the body of the container.

The third embodiment comprises an internal flexible gasket spaced from the top of the mounting cup turret to provide room for the gasket to flex upward arranged on two concentric sealing surfaces. The gasket separates the relief passageway into two chambers, a lower chamber in direct communication with the product and propellant and an upper chamber in direct communication with at least one, but preferably a plurality of vent ports, formed in the turret.

The pressure release point of this embodiment is determined by the gasket thickness, diameter, the diameter of the spacer, and the gasket area exposed to container pressure.

As with the two previous embodiments, the internal flexible gasket may be mounted in the base of the aerosol container.

In operation, when the pressure reaches the pressure relief point, the outer portion of the gasket will be forced upward allowing product and propellant to pass through the lower and upper chambers out the vent ports into the atmosphere.

When the container pressure decreases below the release point, the gasket will reseat.

To pressure fill, product and propellant are forced through the vent ports and against the surface of the internal gasket. This causes the gasket to flex downward allowing product and propellant to flow through the chambers and into the body of the container.

A combination of the external relief ring and internal relief ring embodiments provides a double pressure relief system in which the advantages of both embodiments may be capitalized upon.

With a slight modification, the locking overcap described in the external relief ring embodiment may be adapted to any of the other basic embodiments.

The invention accordingly comprises the features of construction with combination of elements and arrangement of parts which will be exemplified in the construction hereinafter set forth in the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which:

FIG. 1 shows a cross-sectional side view of an aerosol dispenser with an external relief ring in combination with a tamperproofing cap.

FIG. 2 shows a more detailed but partial crosssectional side view of the relief ring mechanism of FIG. 1.

FIGS. 3 through 6 show several alternative embodiments of the external relief ring mechanism.

FIG. 7 to 9 show cross-sectional views of several alternative embodiments of retaining means for the relief ring.

FIG. 10 shows a cross-sectional view of the external relief ring embodiment arranged in position for pressure filling.

FIG. 11 shows a detailed partial cross-sectional view of an internal relief ring embodiment.

FIGS. 12 through 19 show several alternative embodiments of the internal relief ring mechanism.

FIG. 20 shows detailed partial cross-sectional view of an internal flexible gasket embodiment.

FIGS. 21 through 25 shows several alternative embodiments of the internal flexible gasket mechanism.

FIG. 26 shows a partial cross-sectional view of a combination of an internal relief ring and an external relief ring embodiment.

FIGS. 27 through 30 show several alternative embodiments of the combined internal relief ring - external relief ring mechanism.

FIG. 31 shows a cross-sectional view of a bottom mounted external relief ring embodiment.

FIG. 32 shows a cross-sectional view of a bottom mounted internal relief ring embodiment.

FIG. 33 shows a cross-sectional view of a bottom mounted internal gasket relief ring embodiment.

FIG. 34 shows a cross-sectional view of a tamperproof lock overcap mounted on a valve stem assembly.

FIG. 35 shows a top view of the tamperproof cap with lock and spray indicator.

FIG. 36 shows a cross-sectional top view of the locking overcap taken along line 36—36 of FIG. 34.

DETAILED DESCRIPTION OF THE INVENTION

As seen in FIG. 1, there is illustrated an aerosol dispenser, generally indicated at 10, comprising container 12, mounting cup 14 with turret 18 and valve assembly 16 including valve body 20 and valve stem 22.

A resilient external relief ring 28 is stretched around turret 18 to form a seal between their respective surfaces at 30. At least one, but preferably a plurality of vent ports 24 are formed in turret 18 immediately adjacent to relief ring 28 and in communication with relief passageway 34. Guide vanes 32 are formed on turret 18 and disposed in passageway 34 to direct the flow of overpressurized product and propellant against relief ring 28 through vent ports 24 (see FIG. 2). Relief ring 28 is secured in place by tamperproof cap 36 through the cooperative engagement of annular slot 42 formed in the upper circumference of the ring 28 and annular ridge 44 formed in cap 36. A plurality of diffuser vents 40 are formed in the skirt of overcap 36 act as a diffuser for the relief system.

FIG. 3 shows a chamber 48 formed in the inner surface of ring 28 immediately adjacent to vent port 24 to control the pressure release point. The size and shape of chamber 48 may be varied to change the release point. In addition, as seen in FIG. 4, an undercut 50 in ring 28 may be included to control the pressure release point. The release point varies with the size and angle of undercut 50.

FIG. 5 shows an alternative embodiment where relief ring 28 is extended to seal vent ports 52 and 54 arranged at the base and/or the top of turret 18.

FIG. 6 shows an alternative embodiment where the external relief ring 28 retained by tamperproof cap 36 seals passage 35 formed between the crimped edges of mounting cup 14 and container 12. This may be in addition to or in place of ring 28 mounted on turret 18 as shown in the basic embodiment.

FIGS. 7, 8, and 9 show alternative means of securing or retaining relief ring 28 to turret 18. FIG. 7 shows an undercut 56 formed in the upper portion of the mounting cup 18 thereby acting as a wedge against removal when the ring 28 is in place. FIGS. 8 and 9 show a spring wire 58 and snap band 60 respectively arranged circumferentially about the pressure relief ring 28 to secure pressure relief ring 28 to turret 18.

Normally the internal pressure within the container 12 is insufficient to break the seal between ring 28 and turret 18. However, when the internal pressure increases over the pressure release point, the product and/or propellant are forced upward into relief passage 34 and directed outward through vent ports 24 against relief ring 28 by guide vanes 32. As best seen in FIG. 2, when the pressure reaches the pressure release point, the lower portion of ring 28 flexes outward breaking the seal between the turret 18 and the ring 28 allowing product and/or propellant to escape through space 33 and diffuser vents 40 into the atmosphere. When the pressure decreases to the pressure release point, ring 28 will again seal against turret 18 blocking any further escape of propellant and/or product through vent ports 24.

A similar flexing action of ring 28 is experienced in alternative embodiment of FIG. 4 except escape of product and/or propellant is through space 33 formed by the undercut 50.

In FIG. 5 the extremities of ring 28 flex upward in an overpressure condition to allow escape through ports 52 and 54.

In FIG. 6 the product and/or propellant flows through space 35 out against ring 28 and directly into the atmosphere in an overpressure condition.

As previously described, the vent ports 24 may be used to pressure fill the container 12 prior to applying the relief ring 28. With reference to FIG. 10, it can be seen that product and/or propellant may be forced into ports 24 prior to attaching ring 28.

FIGS. 11 through 19 show the second embodiment comprising an internal relief ring 62 located in the relief passageway 34 formed between the valve body 20 and turret 18. The size of ring 62 is such that it seals against the inner surface of turret 18 and the valve body 20. The internal relief ring 62 divides the relief passageway 34 into a lower chamber 64 in direct communication with the product and propellant and an upper chamber 66 which is in direct communication with at least one but preferably a plurality of vent ports 67 formed on the side of turret 18. Alternatively the space formed by aperture 26 about the upper portion of valve stem may function as a vent port.

At least one extremity of relief ring 62 includes a flexing lip 70 designed to flex either in an internal overpressure condition or during pressure filling such that when flexed the seal is broken thus permitting communication between chambers 64 and 66.

The side wall of turret 18 may contain a crimp 72 to secure ring 62 in place.

During normal conditions the internal relief ring 62 seals against the turret and valve body to prevent the escape of product and/or propellant. However, when the pressure reaches the pressure release point product and/or propellant passes upward through the lower chamber 64 and against the flexible lip 70 breaking the seal thereby allowing product/or propellant to flow through upper chamber 66 and into the atmosphere via aperture 26 or vent ports 67. As seen in FIG. 17 and 18 guide vanes 68 may be formed in turret 18 immediately adjacent to ports 67 to direct the overflow to the atmosphere.

To pressure fill, the product and/or propellant is forced under pressure, through vent ports 67 or aperture 26 into chamber 66. There the pressure flexes lip 70 inward to allow the product and/or propellant to flow through chamber 64 and into the body of container 12. Upon completing the filling process lip 70 automatically returns to its normal position sealing against turret 18 and valve body 20.

FIGS. 20 through 23 show the third embodiment comprising an internal flexible gasket 74 held from the top turret 18 to form a space 84 which provides room for the gasket 74 to flex upward. The valve body 20 has a smaller diameter sealing surface 78 which is forced into the gasket 74 to give proper gasket compression and a larger outer sealing surface 80 slightly higher than the smaller surface 78 which flexes the gasket 74 slightly upward and against the turret 18 to form a seal between the gasket 74 and the turret.

The relief passageway comprises two chambers separated by the gasket 74 wherein the lower chamber 82 is in communication with the product and propellant and the upper chamber 84 is in communication with at least one, but preferably a plurality of, vent ports formed in the side or top of turret 18. Alternatively, aperture 26 may be used as a vent port either with or in place of side vents 86 and top vents 88.

FIGS. 24 and 25 show alternative embodiments where lip 75 of gasket 74 has been cut to form sealing engagement with the side or top of the turret 18 respectively.

The position of sealing surface 78 relative to sealing surface 80, the thickness of gasket 74 and the material of gasket 74 all control the pressure release point.

Normally the outer surface of gasket 74 prevents the flow or product and/or propellant from lower chamber 82 to upper chamber 84. However, when the pressure reaches the pressure release point, gasket 74 flexes upward allowing product and/or propellant to flow from chamber 82 into and through chamber 84 and through port 86 or aperture 26 into the atmosphere. As the pressure decreases below the pressure release point, gasket 74 again reseals against sealing surface 80.

In the alternative embodiment of FIGS. 24 and 25, lip 75 flexes upward or sideways at the pressure release point to allow flow from chamber 82 through chamber 84 and ports 88 or aperture 26 into the atmosphere. Lip 75 will reseal against turret 18 when the pressure decreases to below the pressure release point.

To pressure fill, pressurized product and/or propellant are fed into ports 86 and 88 or through aperture 26 against gasket 74 or lip 75 flexing them inward and downward to permit flow through chambers 84 and 82 into container 12.

A fourth embodiment, shown in FIGS. 26 through 30, comprises a combination of the external relief ring 28 and internal relief ring 62 whereby the basic features of each relief ring are included.

The operation of this fourth embodiment is fully illustrated in FIG. 29. In an overpressure condition product and/or propellant passes upward through chamber 64 forcing lip 70 of internal relief ring 62 upward breaking the seal between the lip 70 and valve stem 20 allowing the fluid to flow into chamber 66. From these guide vane 68 directs the flow through vent 67 into chamber 48 and against external relief ring 28. This causes the upper and lower portions of ring 28 to separate at undercut 50 to permit flow outward into the atmosphere. As the internal pressure decreases below the pressure release point, undercut 50 again reseals, a further decrease permits lip 70 to reseal.

As can be seen, this combination provides a maximum of variables to determine and control the pressure release point.

The use of this embodiment as a pressure filling system is similar to that of the internal relief ring system. Before the external relief ring 28 is applied, product and propellant are forced under pressure into ports 67 through chamber 66 and against lip 70. As lip 70 flexes under this pressure the fluid passes freely into the container 12. After the proper amount of fluid is fed into the container 12 external pressure filling is discontinued to allow lip 70 to return to sealing engagement with valve body 20 to prevent escape of product or propellant. External relief ring 28 is then stretched over turret 18.

As shown in FIGS. 31, 32, and 33, each of the three basic embodiments may be adapted for use with a turret 84 on the bottom of the aerosol dispenser 12. FIG. 31 shows external relief ring 83 secured to bottom turret 85 by means of spring wire 86. As in the top mounted ring 28, a snap band or undercut may be used in place of spring wire 86 as shown in FIGS. 7 and 9 respectively. In contrast to the top mounted ring 28, there is no relief passage. The product communicates directly with ring 83 through vent ports 88 found in the side of turret 85.

A tamperproof cap 90 may be secured to the ring and turret assembly by annular ridge 92 engaging annular slot 94 formed on the outer surface of ring 83.

In operation as the pressure inside the container 12 increases to the pressure release point the product and/or propellant force outward through ports 88 against ring 83 breaking the seal between ring 83 and turret 85 allowing the product and/or propellant to escape into the atmosphere around the base of cap 90. As the pressure decreases to the pressure release point the ring 83 again engages turret 85 to form a seal to prevent further escape or product and/or propellant.

As with the top mounted external relief ring, product and propellant may be pressure filled through vent ports 88 before applying ring 83.

FIG. 32 shows internal relief ring 96 arranged to form a seal with the inside of bottom turret 85. Flexible sealing lips 98 seal off relief passage 100 and vent ports 88 from the container contents.

FIG. 33 shows internal gasket 102 in sealing engagement with the interior wall of turret 85. Gasket 102 is flexed downward by cooperative engagement of members 104 and 106. Relief passage 107 which communicates with relief ports 88 is sealed from the product.

In either the internal relief ring embodiment of FIG. 32 or internal gasket embodiment of FIG. 33 when the pressure inside the container increases to the pressure release point lips 98 and 104 flex downward allowing product and/or propellant to flow through chambers 100 and 107 respectively and into the atmosphere through ports 88. When the pressure decreases to the pressure release point lips 98 and 104 return to the inward position to form sealing bonds to prevent any further escape of product and/or propellant.

Forcing pressurized product and/or propellant into ports 88, will cause lips 98 and 104 to flex upward thus allowing pressure filling of the container 12.

FIG. 34 shows a locking overcap indicated generally at 108 mounted on cap 36 and valve stem 22. Locking overcap 108 is secured to cap 36 by means of locking feet 110 formed on the lower portion of the overcap 108 cooperatively engaging interrupted locking grooves 46. Overcap 108 may be adjusted vertically in grooves 46 to accommodate valve stems of various heights.

Overcap 108 includes recess 112 and discharge passage 114 formed in nozzle 116. Nozzle 116 is provided with tab 118 to facilitate rotation of rotating overcap 108 from the lock to the spray position.

As shown in FIG. 35, indicators lock 115 and spray 117 are formed on the top of tamperproof cap 36. The lock indicator is raised to form a post 115 which in cooperation with aperture 120 formed in overcap 108 lock the overcap 108 in place.

As seen in FIG. 36, channel 122 is formed in cap 36 to permit vertical movement of overcap 108 without interference with nozzle 116.

When in the lock position locking feet 110 engage locking grooves 46 to prevent vertical movement of the overcap 108. In this position the indicator lock will be wedged in aperture 120 to prevent rotation of the overcap 108. To place in spray position, the operator depresses post 115 and rotates overcap 108 90° using tab 118 as a lever. In the spray position indicator 117 will appear in aperture 120. Nozzle 116 will align directly over channel 122. The operator may then depress the overcap 108 to actuate the valve assembly.

To return to the lock position the operator rotates the overcap 108 by tab 118 90° where lock wedge 115 will pop into aperture 120 to lock in place.

It will thus be seen that the objects set forth above, among those made apparent from the preceding description, are efficiently attained and, since certain changes may be made in the above construction without departing from the scope of the invention, it is intended that all matter contained in the above description as illustrative and not in a limiting sense.

Now that the invention has been described, what is claimed is:

1. A pressure relief system for an aerosol dispenser of the type utilizing a valve body, said pressure relief system comprising at least one turret formed on the dispenser, said pressure relief system including flexible sealing means comprising an annular ring having a pressure control means formed thereon, said pressure control means disposed and configured to control a pressure relief point, said flexible sealing means mounted internally in said turret and in sealing engagement with the internal wall surface of said turret and the external wall surface of said valve body, said flexible sealing means disposed to seal at least one vent port disposed in fluid communicating relation between the exterior and interior of said dispenser, said pressure control means arranged relative to said vent port such that the interior pressure of said dispenser acts directly against said flexible sealing means to break said sealing engagement of said flexible sealing means with either the interior wall surface of said turret or the exterior wall surface of said valve body at the predetermined pressure release point.

2. The system of claim 1 wherein said flexible sealing means comprises an internal relief ring arranged relative to the top of said turret such that said ring, said turret and said valve body cooperate to form a lower chamber in direct communication with product and propellant and an upper chamber in direct communication with said vent port.

3. The system of claim 2 wherein said internal relief ring includes a flexing lip on at least one of its extremities, whereby the overpressure of product and/or propellant will cause said lip to flex thereby breaking the sealing engagement between said lip and either said turret or said valve body.

4. A pressure relief system for an aerosol dispenser which incorporates a valve body, said pressure relief system comprising at least one turret formed on the dispenser, said pressure relief system including a flexible sealing means in the form of an annular ring having a pressure control means formed thereon, said pressure control means disposed and configured to control a pressure release point, said flexible sealing means mounted internally in said turret and in sealing engagement with said valve body, said annular ring disposed to seal at least one vent port which itself is disposed in fluid communication between the exterior and interior portions of said dispenser, said valve body having an outer annular wall portion disposed concentrically to the remainder of said valve body, said annular ring comprising an internal flexible gasket forming the sealing engagement with two concentric sealing surfaces of said valve body defined at least in part by said annular concentric wall portion of said valve body.

5. The system of claim 4 wherein said internal flexible gasket is arranged relative to said turret such that said gasket, said turret and said valve body cooperate to form a lower chamber in direct communication with product and propellant and an upper chamber in direct communication with said one vent port.

6. The system of claim 2 wherein said internal flexible gasket includes a flexing lip which forms a sealing engagement with said turret under normal conditions and flexes to break said engagement when exposed to an over pressure condition.

7. The system of claim 1 wherein said vent port is formed in a turret on the base of said dispenser.

8. The system of claim 1 wherein said dispenser includes a container and valve mounting cup attached thereto said vent port comprising an open space cooperatively formed between said container and said valve mounting cup.

9. The system of claim 1 wherein said vent port is formed between the mounting cup of said dispenser and its valve body.

* * * * *